Patented May 14, 1940

2,200,484

UNITED STATES PATENT OFFICE 2,200,484

ASPHALTIC COMPOSITION AND METHOD OF PREPARING SAME

Augustus H. Batchelder, Berkeley, Calif., assignor to Standard Oil Company of California, San Francisco, Calif., a corporation of Delaware No Drawing. Application April 5, 1938, Serial No. 200,161

8 Claims. (Cl. 196—22)

The present invention relates to the manufacture and treatment of asphalt.

I have discovered that it is possible to prepare a composition of matter which, at ordinary atmospheric temperature, without the use of any thinner, is readily flowable, but which is readily convertible into hard or extremely viscous asphalt. This composition of matter has the further advantage of remaining in such comparatively non-viscous, flowable condition, at ordinary atmospheric temperature, for long periods of time.

It is an object of my invention to produce a liquid asphaltic composition which is readily convertible into solid or extremely viscous asphalt by application of heat, whereby many of the difficulties of shipping, handling and using hard asphalts are eliminated.

It is a further object of my invention to provide a method of utilizing asphaltic compositions which possess the component parts of hard asphalts for many purposes for which they are not now suited because they exist in solid or extremely viscous form or in a liquid form which, for some purposes, renders them unusable or difficult to use because of the high temperature of their liquid state and the difficulty of applying such heat.

Asphalts are a colloidal system composed mainly of oil fractions, asphaltenes and asphaltic resins. In this specification, by asphaltenes is meant that non-mineral portion of asphalt which is not soluble in light petroleum fractions such as liquid propane and butane.

I have discovered that when asphaltenes are separated from asphalt, or otherwise obtained, and are then dispersed in a suitable oil, the asphaltenes go back into solution with unexpected slowness. I have prepared such dispersions which have lasted over a period of months. By solution herein is meant solution in the non-technical sense, because the asphaltenes are not considered to exist in ordinary asphalt in the form of true solutions, but are peptized by the asphaltic resins and exist in colloidal solution. Therefore, when I speak of the asphaltenes in the suspension going into solution I mean forming the colloidal system normal to asphalt.

The presence of the dispersed, undissolved asphaltenes in the oil fraction in such form gives the system a lowered viscosity or softness much greater than would be found in asphalt with the same component parts and percentages in the normal state at atmospheric temperature. Such dispersions can be prepared with an apparent viscosity a fraction of a per cent of that of the asphalt into which they may be easily converted by relatively mild heating.

Thus I have found that asphaltic compositions, without any alteration of the nature or amount of their component parts, can be made to exist in two distinct and reversible states or conditions. The first, which might be called the normal state, is hard or extremely viscous; and the second, or intermediate state, is greatly softer or less viscous than the first, yet, though it will last for months, is easily converted into the first state by moderate heating and subsequent atmospheric temperature cooling.

The asphaltenes may be obtained by separating them from asphalts by the use of solvents which dissolve the oil but which do not dissolve the asphaltenes. Among such solvents are liquid propane, butane, acetone, naphtha, casinghead gasoline.

While in some cases it is not necessary, after the asphaltenes have been precipitated by solution of the oil fraction in the solvent, first to remove the asphaltenes from the oil fraction in order to obtain the dispersion of undissolved asphaltenes, I have found greatly improved results are obtained if the asphaltenes are removed and freed of entrained oil and solvent before the dispersion is then formed.

It has likewise been found that a more lasting dispersion of the undissolved asphaltenes is obtained if the asphaltenes are aerated so as to form a protective film containing oxygen which resists tendency of the asphaltenes to be dissolved in the oil.

It is not necessary to recombine the asphaltenes and the oil from which they have been separated, but the separated asphaltenes may be suspended in other oil selected to produce an asphalt with the desired characteristics, such as melting point, penetration, ductility and weathering characteristics.

Likewise the asphaltenes may be produced by extensive oxidation of oils, whereby the oil and asphaltic resins are converted into asphaltenes, and then suspended in an oil.

The life of the dispersion of undissolved asphaltenes in oil, whereby the suspension will endure for long periods and resist tendency to go into solution even at temperatures considerably higher than normal atmospheric, may be varied by the choice of the oil in which the asphaltenes are to be suspended. In aromatic oils the suspension is less lasting than in paraffinic oil. The life of the suspension is also lowered with the increase in percentage of asphaltic resins in the oil in which the asphaltenes are suspended.

In applications of my invention even where a highly permanent suspension has been prepared, the conversion of the suspension into normal, harder or more viscous asphalt is produced very quickly merely by the application of moderate heat followed by cooling. Normal atmospheric cooling is sufficient though the hardening process may be facilitated by artificial cooling. The asphaltenes go rapidly into solution around the temperature of the melting point of the asphalt to be formed. However, even with stable dispersions, and even at ordinary atmospheric temperatures, some asphaltenes will go into solution.

The numerous advantages of the use of my invention are manifest. The suspensions may be transported in ordinary tank ships, tank cars and trucks as pumpable liquids and, when ready for use as hard asphalts, be converted into hard asphalt by heat. The suspensions may be used as colloidal fuels. Another use is in the manufacture of heat molding compositions, plastics, quick-setting adhesives, mastics, and in other applications which require compounds which can be worked or molded cold and can be set up rapidly by application of moderate heat.

To illustrate the application of my invention, three different types of asphalts, whose characteristics are shown in Table 1 below, were separately treated with liquid butane. The asphaltenes, after being allowed to settle, were drawn off and dried. After the extracted oils had been freed of the butane, the asphaltenes were mixed in with the oil from which they were extracted at atmospheric temperature. The results are shown in Table 1.

Table 1

|  | California air-blown paving asphalt | California roofing asphalt | Synthetic asphalt |
|---|---|---|---|
| Penetration at 32° F., 200 g., 60 sec. | 27 | 13 | 90 |
| Penetration at 77° F., 100 g., 5 sec. | 63 | 21 | 98 |
| Penetration at 115° F., 50 g., 5 sec. | 251 | 38 | 157 |
| Apparent viscosity at 77° F., poises | 1.7×10⁶ | 1.4×10⁷ | 7.2×10⁵ |
| Softening point, Ring and Ball, °F | 128 | 225 | 174 |
| Ductility at 77° F., C. M. | 150 | 2.0 | 2.25 |
| Percent asphalt soluble in butane | 65.6 | 58.1 | 60 |
| Viscosity of butane soluble oil: | | | |
| S. S. U., 130° F | 2880 | 994 | 62 |
| S. S. U., 210° F | 228 | 109 | 38 |
| Poises at 77° F. (estimated) | 13 | 4.5 | 0.4 |
| Observed apparent viscosity of suspension at 77° F., poises | 1200 | 1250 | 1230 |

It will be seen that the viscosities of the suspensions are approximately 1/1000 that of the original viscosities of the asphalts. After having been kept at ordinary atmospheric temperature for more than three months the asphalts had become more viscous only by about 2200 poises. Yet, when moderately heated to slightly above the melting points of the original asphalts, the suspensions promptly assumed their original hardness upon cooling. Likewise the other qualities of the regenerated asphalts were identical with those of the original asphalts.

It will be seen from the three samples chosen to illustrate my invention that no effort was made to practice my invention under ideal circumstances. The asphalts selected contained a large percentage of aromatic oil. I found that when asphalts containing mainly paraffinic oils had been chosen for formation of a dispersion or that when the asphaltenes had been suspended in substituted paraffinic oils, the viscosity of the suspensions was greatly lowered. When very low viscosity was desired I found it could be obtained by cutting back a suspension made from a low penetration air-blown stock.

Asphaltenes have been defined above as that portion of asphalt which is not soluble in light petroleum fractions such as liquid propane and butane. However, when asphaltenes are obtained by a selective solvent which dissolves the oil fraction and precipitates asphaltenes, it will not be satisfactory for the purposes of this invention to use propane if the asphaltic resin content of the oil before application of the solvent is high. This is because propane, being a comparatively weak solvent, fails to dissolve a sufficiently large percentage of the asphaltic resins. The resins are then precipitated as part of the asphaltenes, in such amounts as to result in the production of asphaltenes which are too readily redissolved into the oil portion. When the resin content of the oil from which the asphaltenes are to be precipitated is high, a light petroleum solvent stronger than propane, such as butane, should be used, whereby a suitable proportion of the resins is kept in the oil phase. This is especially true when the charging stock consists of steam refined asphalt. In cases where the charging stock is air-blown asphalt, the resin content would be expected to be low so that propane would be preferred. The desired solvency may, of course, be varied by suitably arranging temperatures and proportions of solvent to charging stock. In general stronger solvents yield asphaltenes which are less easily redissolved, while the use of weaker solvents results in the recovery of oils of lower viscosity.

By liquid, wherever used herein, is meant the non-technical meaning of the word as something which will flow and is not solid.

The foregoing exemplary description is merely illustrative of a mode of carrying out my invention and is not to be taken as limiting, as many variations may be made within the scope of the following claims by a person skilled in the art without departing from the spirit hereof.

I claim:

1. A process of treating asphalt comprising separating asphalt into an oil fraction and an asphaltene fraction by a selective solvent which dissolves the oil fraction but not the asphaltenes, freeing the oil fraction and the asphaltenes of the solvent, drying the asphaltenes, and forming a substantially undissolved, non-colloidal dispersion of the substantially oil-free asphaltenes in the oil, said dispersion having a lower viscosity than the starting asphalt said dispersion having the quality of remaining liquid until heated above atmospheric temperatures, by commingling the asphaltenes and the oil fraction.

2. A process of making an asphaltic composition, liquid at normal atmospheric temperatures, but which becomes hard upon cooling after heating, which comprises separating asphalt into an oil fraction and an asphaltene fraction and forming a substantially undissolved, non-colloidal dispersion of the substantially oil-free asphaltenes in oil by commingling the asphaltenes fraction and oil fraction.

3. A process of treating asphalt comprising separating asphalt into an oil fraction and an asphaltene fraction by a selective solvent which dissolves substantially all of the asphalt except the asphaltenes, freeing the dissolved fraction and the asphaltenes of the solvent, blowing the asphaltenes with an oxygen-containing gas, and forming a substantially undissolved, non-colloidal dispersion of the substantially oil-free asphaltenes in oil, said dispersion having a lower viscosity than the starting asphalt, by commingling the asphaltenes and the oil fraction.

4. A method of preparing a normally liquid composition of matter characterized by the ability to alter its state to one of greatly increased viscosity at atmospheric temperature after being heated, which comprises forming a substantially stable undissolved discontinuous, non-colloidal phase of asphaltenes in a continuous oil phase by suspending substantially asphaltic-resin-free, oil-free asphaltenes in the oil and maintaining the temperature of the mixture during the suspending operation below that at which the asphaltenes dissolve in said oil.

5. A method of preparing a normally liquid composition of matter characterized by the ability to alter its state to one of greatly increased viscosity at atmospheric temperature after being heated, which comprises forming a substantially stable undissolved discontinuous, non-colloidal phase of asphaltenes in a continuous oil phase by oxidizing the surface of asphaltic resin-free, oil-free asphaltene particles to form an oxygen-containing film thereon, suspending said asphaltene particles in the oil and maintaining the temperature of the mixture during the suspending operation below that at which the asphaltenes dissolve in said oil.

6. A method of preparing a normally liquid composition of matter characterized by the ability to alter its state to one of greatly increased viscosity at atmospheric temperature after being heated, which comprises forming a substantially stable undissolved discontinuous, non-colloidal phase of asphaltenes in a continuous oil phase by separating substantially asphaltic resin-free, oil-free asphaltenes from an asphaltic composition, suspending the asphaltenes in the continuous oil phase and maintaining the temperature of the mixture during the suspending operation below that at which the asphaltenes dissolve in said oil.

7. A normally liquid composition of matter capable of solidifying at atmospheric temperatures after heating to elevated temperatures which comprises a continuous oil phase, containing insufficient dissolved asphaltenes to produce solidification of the composition and a stable undissolved discontinuous non-colloidal phase of asphaltenes, said asphaltenes being substantially free of oil and asphaltic resins.

8. The composition of matter as defined in claim 7 in which the surface of the suspended asphaltene particles comprises an oxygen-containing film capable of stabilizing said asphaltenes against solvation by said oil.

A. H. BATCHELDER.